(12) United States Patent
Wang

(10) Patent No.: US 6,683,903 B1
(45) Date of Patent: Jan. 27, 2004

(54) METHOD AND APPARATUS FOR SYNCHRONIZATION WITHIN A SPREAD-SPECTRUM COMMUNICATION SYSTEM

(75) Inventor: Michael M. Wang, Carpentersville, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/559,788

(22) Filed: Apr. 27, 2000

(51) Int. Cl.⁷ .............................. H04B 1/69; H04B 7/216
(52) U.S. Cl. ........................................ 375/130; 370/342
(58) Field of Search ............................... 375/130, 135, 375/148, 150, 316, 145, 143; 320/342, 320, 335

(56) References Cited

U.S. PATENT DOCUMENTS

| 5,619,524 A | 4/1997 | Ling et al. ............... 375/150 |
| 5,640,431 A | 6/1997 | Bruckert et al. .......... 375/344 |
| 5,659,573 A | 8/1997 | Bruckert et al. .......... 375/130 |
| 5,767,738 A | 6/1998 | Brown et al. ............. 329/304 |
| 5,793,759 A * | 8/1998 | Rakib et al. ............. 370/342 |
| 5,983,113 A * | 11/1999 | Asanuma ................. 455/506 |
| 6,272,168 B1 * | 8/2001 | Lomp et al. ............. 375/222 |
| 6,370,129 B1 * | 4/2002 | Huang .................... 370/329 |

* cited by examiner

*Primary Examiner*—Khai Tran
(74) *Attorney, Agent, or Firm*—Kenneth A. Haas; Lalita W. Pace

(57) ABSTRACT

A sub-Walsh element generator (30) partitions incoming Walsh codes into sub-elements (201–212). A sub-element generator (30) determines if a pair of Walsh sub-elements (201–212) exist at a boundary (401) between Walsh codes (101–102), and if so, the pair of sub-elements is output to a phase difference operator (40). The phase difference operator (40) determines a change in phase between the two consecutive sub-elements that exist at the Walsh code boundaries. The phase difference metric (45) is further accumulated over a predetermined period of time and is utilized to adjust a front-end frequency of a receiver.

6 Claims, 3 Drawing Sheets

METHOD AND APPARATUS FOR SYNCHRONIZATION WITHIN A SPREAD-SPECTRUM COMMUNICATION SYSTEM

FIELD OF THE INVENTION

The present invention relates generally to communication systems and in particular, to a method and apparatus for synchronization within such communication systems.

BACKGROUND OF THE INVENTION

When a mobile unit is first powered on, there can exist a frequency offset between the mobile unit and the base station. This frequency offset is due to inaccuracies in the local frequency synthesizer (which are typically ±5 ppm). Because of this a mobile will have to perform a frequency acquisition stage by an automatic frequency control unit in order to synchronize to the base station. During frequency acquisition, a mobile unit typically estimates the frequency offset based on a phase offset between Walsh symbols. In particular, a frequency offset ($\Delta f$) is usually determined as shown in FIG. 1 by determining a phase difference ($\Delta \theta$) between two adjacent Walsh symbols 101–102 such that, $$\Delta f = \frac{\Delta \theta}{2\pi T}, \quad -\pi < \Delta \theta < \pi,$$

where T is the time interval between two adjacent Walsh symbols 101–102. It is worth noting that condition $-\pi < \Delta \theta < \pi$ is necessary to avoid phase ambiguity. Consequently, for a given $\Delta f$, the maximum allowed T is then $$T < \frac{\pi}{2\pi \times |\Delta f|} = \frac{1}{2|\Delta f|}.$$

If the Walsh symbol time duration (T) is larger than $\frac{1}{2}|\Delta f|$, frequency offset estimation will fail due to the phase ambiguity. Therefore, a need exists for method and apparatus for synchronization within a spread-spectrum communication system that reduces the chance of phase ambiguity.

DETAILED DESCRIPTION OF THE PREFERRED EMBODIMENT

In order to solve the above-mentioned need, a method and apparatus for synchronization within a spread-spectrum communication system is provided herein. In accordance with the present invention each orthogonal code is partitioned into N sub-elements. Only phase estimates of the sub-elements that exist at the orthogonal-code boundaries are utilized in determining phase offset between sub-elements. Because boundary sub-elements are utilized in determining phase offsets, phase difference estimate does not introduce the bias caused by the interfering orthogonal codes, resulting in synchronization within a spread-spectrum communication that reduces the chances of phase ambiguity, yet does not cause bias to the estimated change in phase.

The present invention encompasses a method of calculating a frequency offset. The method comprises the steps of receiving a communication signal comprising a plurality of orthogonal codes and partitioning the plurality of orthogonal code symbols into a plurality of sub-elements. A determination is made if a sub-element from the plurality of sub-elements exists at a boundary between two orthogonal code symbols, and a phase difference operator is applied to the sub-elements based on the determination. Finally, a frequency offset is calculated from application of the phase difference operator on the sub-elements.

The present invention additionally encompasses an apparatus. The apparatus comprises a radio-frequency (RF) front end having a communication signal as an input and outputting a plurality of orthogonal codes, a sub-element generator having the plurality of orthogonal codes as an input and an output consisting of pairs of sub-elements of the plurality of orthogonal code symbols that exist at a boundary between two orthogonal code symbols. Finally, the apparatus comprises a phase difference operator having the pairs of sub-elements that exist at the boundary as an input and outputting a difference in phase between the two consecutive sub-elements.

Figure 1:
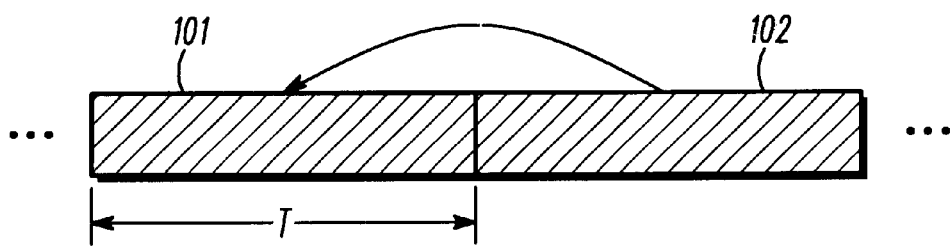
FIG. 1 shows a prior-art method for remote unit synchronization.
Figure 2:
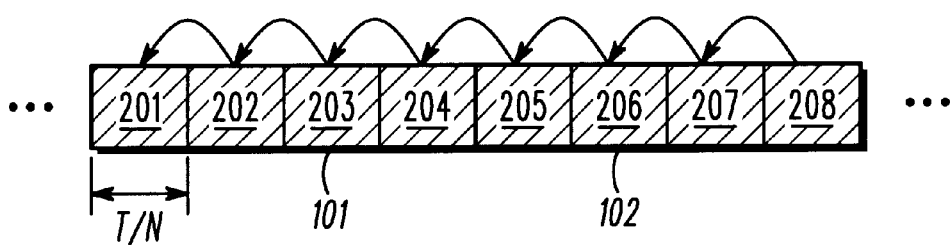
FIG. 2 shows a method for remote unit synchronization in accordance with a first embodiment of the present invention.

Turning now to the drawings, wherein like numerals designate like components, FIG. 2 illustrates a solution for avoiding phase ambiguity by reducing T In particular each orthogonal symbol (e.g., Walsh symbol) 101 and 102 is partitioned into N sub-elements 201–204 and 205–208, where $N=2^n$ and n is chosen to be the smallest n such that $T/N < \frac{1}{2}|\Delta f|$ (N=4 in FIG. 2). The phase difference is then determined between adjacent sub-Walsh elements 201–208.

Although the above technique can avoid phase ambiguity, partitioning a Walsh symbol into N sub-Walsh element results in interference from N−1 other Walsh code users since the N sub-Walsh elements are no longer orthogonal to each other. The impact of the interference on the frequency offset estimate consists of two components $$\Theta = \Theta_W + \Theta_B.$$

$\Theta$ is the phase difference metric by applying phase difference operator 40 on all sub-Walsh symbol elements, and $\Theta_W$ is the result of phase difference operator 40 applied on the sub-Walsh elements within a Walsh symbol with mean of $$E\{\Theta_W\} = \frac{N-1}{N}E_p e^{j\Delta 0} + \sum_{k=1}^{N/2} \frac{N-1}{N} E_{u_k} e^{j(\Delta 0 + \pi)}$$

where $E\{\ \}$ is the mathematical expectation operation, $E_p$ is the pilot Walsh symbol energy, and $E_{u_k}$ is the kth user Walsh symbol energy. $\Theta_B$ is the result of phase difference operator 40 applied on the sub-Walsh elements between Walsh symbols with mean of $$E\{\Theta_B\} = \frac{1}{N}E_p e^{j\Delta\theta} \pm \frac{1}{N}E_{u_k} e^{j\Delta\theta} \sum_k^{N-1} E\{e^{j\phi_i(u_1)} e^{j\phi_{i-1}(u_k)}\} \pm$$

$$\frac{1}{N}\sqrt{E_p E_{u_k}}\, e^{j\Delta\theta}\sum_{k}^{N-1}(E\{e^{j\phi_i(u_k)}\}+E\{e^{j\phi_{i-1}(u_k)}\})$$

where $\phi_i(u_k)$ is the data phase angle of the ith Walsh symbol for user $u_k$ ($\phi_i \in \{-\pi,\pi\}$ for BPSK and $$\phi_i \in \left\{-\frac{\pi}{4}, -\frac{3\pi}{4}, \frac{\pi}{4}, \frac{3\pi}{4}\right\}$$

for QPSK). Note that $\phi_i(u_k)$ and $\phi_{i-1}(u_k)$ are independent with zero mean so that $$E\{\phi_i(u_k)\phi_{i-1}(u_k)\}=E\{\phi_{i-1}(u_k)\}E\{\phi_{i-1}(u_k)\}=0.$$

It follows that $$E\{\Theta_B\}=\frac{1}{N}E_p e^{j\Delta 0}\pm\frac{1}{N}E_{u_k}e^{j\Delta 0}\sum_{k}^{N-1}E\{e^{j\phi_i(u_k)}\}E\{e^{j\phi_{i-1}(u_k)}\}\pm$$

$$\frac{1}{N}\sqrt{E_p E_{u_k}}\, e^{j\Delta 0}\sum_{k}^{N-1}(E\{e^{j\phi_i(u_k)}\}+E(e^{j\phi_{i-1}(u_k)}))$$

$$=\frac{1}{N}E_p e^{j\Delta 0},$$

It is clear that $\Theta_B$ results in an unbiased estimate of $\Delta\theta$ while $\Theta_W$ results in a biased estimate of $\Delta\theta$ (with a bias up to $\pi$) which can lead to frequency estimation failure.

Figure 3:
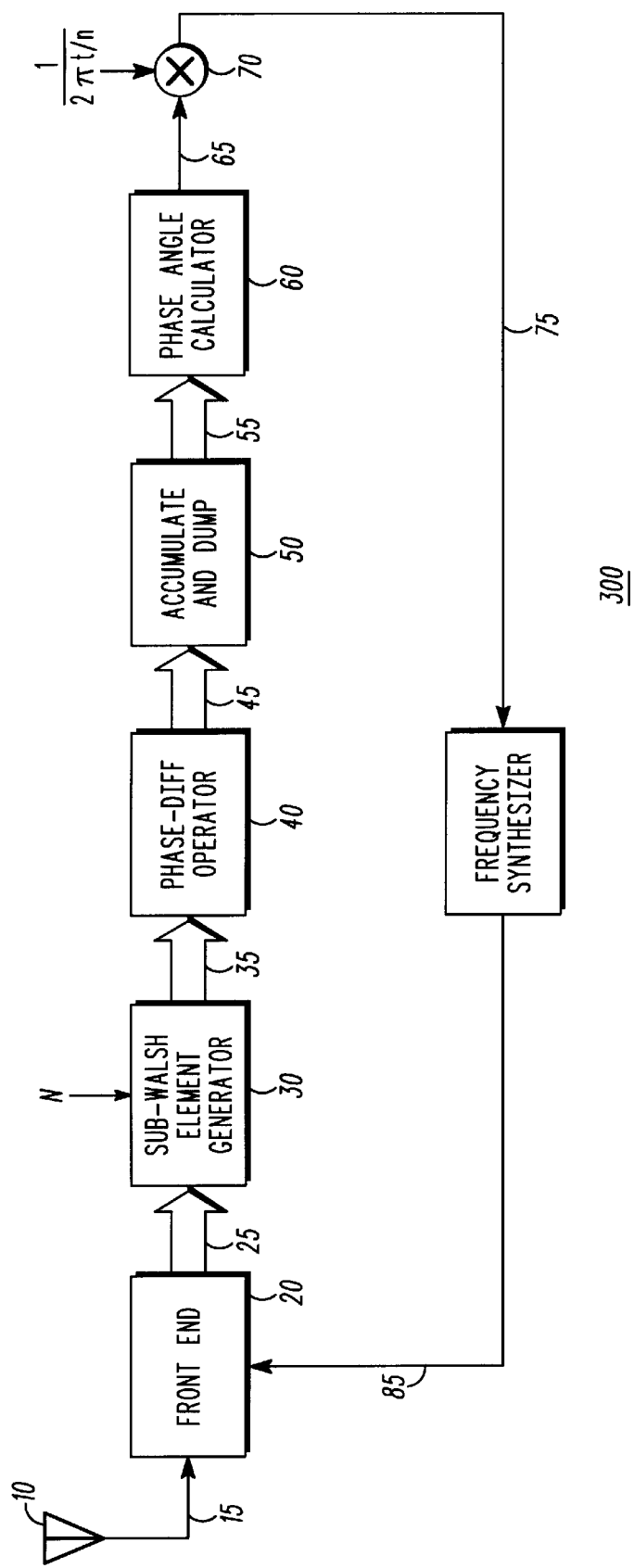
FIG. 3 is a block diagram of a frequency estimator in accordance with the preferred embodiment of the present invention.

FIG. 3 illustrates a block diagram of an automatic frequency control system 300 within a mobile station in accordance with the preferred embodiment of the present invention. In accordance with the preferred embodiment of the present invention antenna 10 receives a radio-frequency (RF) communication signal 15 (at a certain frequency) from the base communication unit. Signal 15 carries pilot signal and a number of user signals separated by orthogonal codes such as Walsh codes. Front-end processing 20, such as filtering, frequency down-converting is performed by well-known methods.

Figure 4:
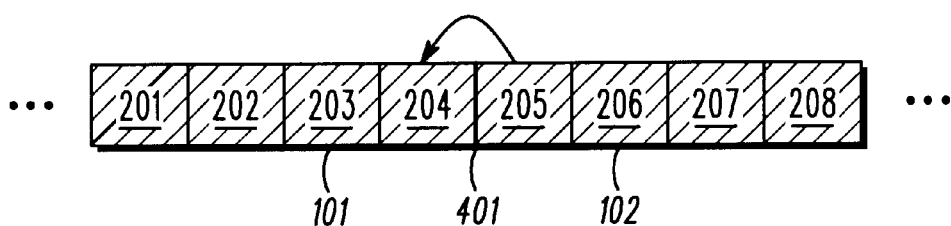
FIG. 4 shows synchronization with orthogonal codes in accordance with the preferred embodiment of the present invention.

Processed signal 25 (complex) from block 20 enters sub-Walsh element generator block 30. As shown in FIG. 4, in accordance with the preferred embodiment of the present invention, each orthogonal symbol (in this case Walsh symbol) 101–102 is partitioned into N sub-Walsh elements 201–208 by generator block 30, where N=4 is used as an example. Only the pair of the partitioned elements 204 and 205 existing at the boundary 401 between two Walsh symbols 101–102 are retained and forwarded to the next processing stage. In other words, unlike the method described in FIG. 2 where all sub-elements 201–208 are utilized in determining a phase offset, in the preferred embodiment of the present invention only those sub-elements existing at orthogonal code boundaries 401 are utilized in determining phase offset.

Returning to FIG. 3, each sub-Walsh element pair 35 (complex) from the sub-Walsh element generator 30, is processed by a well-known phase-difference operator 40 and phase-difference operator 40 outputs a phase difference metric 45 (complex)

$$[s_{i-1}^{(N)}]^* s_i^{(1)}$$

where $s_i^{(n)}$ is the nth element of Walsh symbol i.

The phase difference metric 45 is further accumulated over a predetermined period of time, i.e., M Walsh symbols, to produce $\Theta_B$ at block 50, where $$\Theta_B = \sum_{i}^{M}[s_{i-1}^{(N)}]^* s_i^{(1)}.$$

The result 55 ($\Theta_B$) (complex) is dumped to phase angle calculator 60 to give a phase difference estimate 65 ($\Delta\hat{\theta}$) (real), where $$\Delta\hat{\theta}=\arg(\Theta_B), -\pi<\Delta\hat{\theta}<\pi.$$

The phase angle calculator 60 is well known in the art and may be implemented in a variety of ways such as a lookup table or Tayler expansion. The phase difference estimate 65 is scaled 70 to give a corresponding frequency estimate 75 ($\Delta f$), where $$\Delta \hat{f} = \frac{\Delta\hat{\theta}}{2\pi T/N}.$$

$\Delta f$ is then feed back to the frequency synthesizer 80 to correct the frequency offset so that local frequency 85 is synchronized better to the base signal frequency 15. N is then reduced by a predetermined factor and the above process is repeated. The frequency offset estimate is therefore refined after each iteration. The process is repeated until N=1, i.e., no partition is performed.

Figure 5:
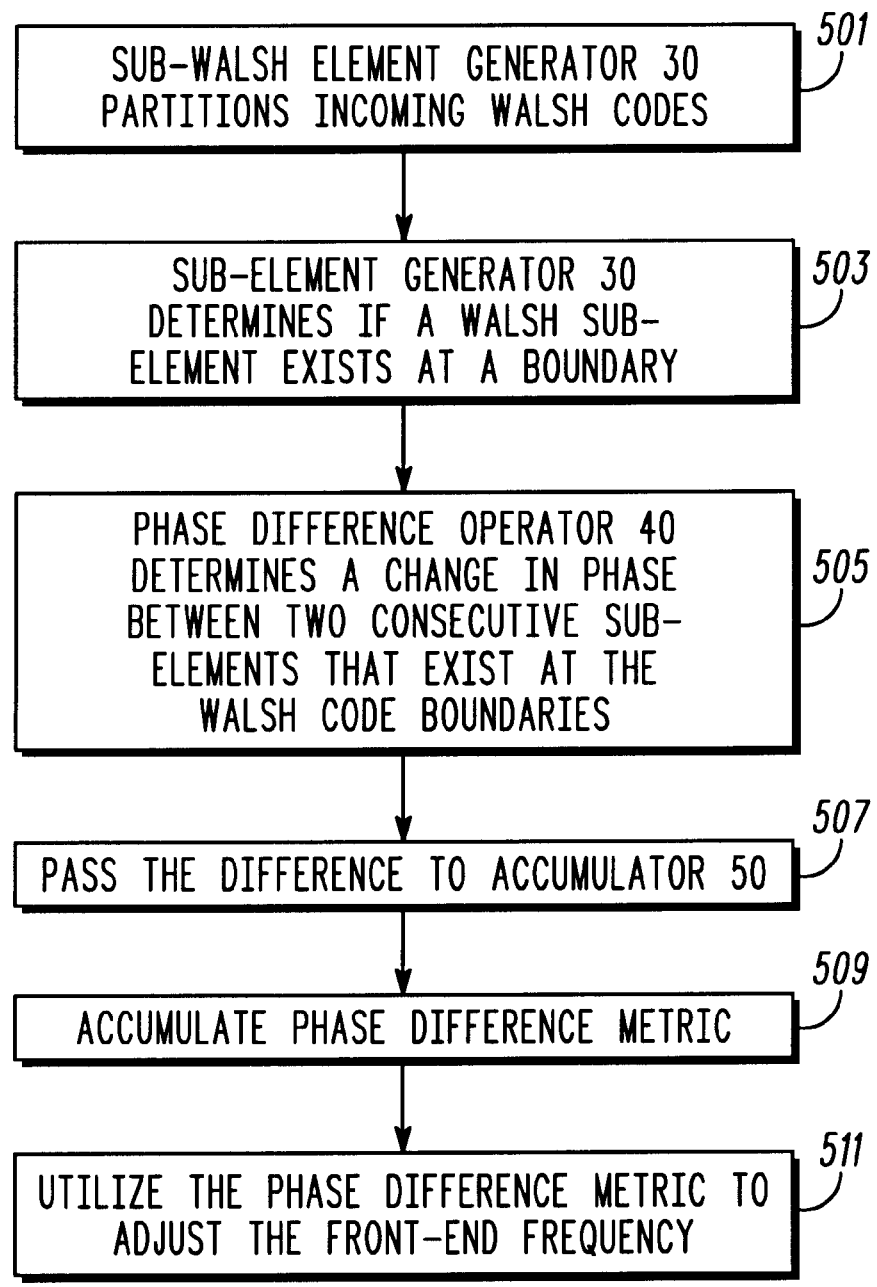
FIG. 5 is a flow chart showing operation of the frequency estimator of FIG. 3 in accordance with the preferred embodiment of the present invention.

FIG. 5 is a flow chart showing operation of the frequency estimator of FIG. 3 in accordance with the preferred embodiment of the present invention. The logic flow begins at step 501 where sub-Walsh element generator 30 partitions incoming Walsh codes. At step 503 sub-element generator determines if a Walsh sub-element exists at a boundary 401 between Walsh codes, and if so, the sub-element pair is output to phase difference operator 40. At step 505 phase difference operator 40 determines a change in phase between the two consecutive sub-elements that exist at the Walsh code boundaries. In other words, a difference in phase between the last sub-element of a Walsh code, and the first sub-element of a succeeding Walsh code is determined at step 505, and this difference is passed to accumulator 50 (step 507). The logic flow continues to step 509 where the phase difference metric 45 is further accumulated over a predetermined period of time. Finally, at step 511, the phase difference is obtained from the accumulated phase difference metric, the corresponding frequency offset is obtained from the phase difference and is utilized to adjust the front-end frequency.

Because only boundary sub-elements are utilized in determining phase offsets, there is no phase bias in the accumulated phase difference metric, resulting in synchronization within a spread-spectrum communication that reduces the chances of phase ambiguity, yet does not cause bias to the estimated change in phase.

While the invention has been particularly shown and described with reference to a particular embodiment, it will be understood by those skilled in the art that various changes in form and details may be made therein without departing from the spirit and scope of the invention. For example, although the preferred embodiment of the present invention was described with respect to partitioning Walsh codes, one of ordinary skill in the art will recognize that any spreading code utilized in spread-spectrum transmission may be partitioned. It is intended that such changes come within the scope of the following claims.

What is claimed is:

1. A method of calculating a frequency offset, the method comprising the steps of:
   receiving a communication signal comprising a plurality of orthogonal codes;
   partitioning the plurality of orthogonal codes into a plurality of sub-elements;
   determining if at least one sub-element from the plurality of sub-elements exists at a boundary between two orthogonal code symbols;
   if at least one sub-element from the plurality of sub-elements exists at a boundary between two orthogonal code symbols,
      applying a phase difference operator on the at least one sub-element existing at a boundary between two orthogonal code symbols to produce a phase difference metric; and
      calculating the frequency offset based on the phase difference metric.

2. The method of claim 1 wherein the step of receiving the communication signal comprises the step of receiving a spread-spectrum, radio-frequency (RF) communication signal.

3. The method of claim 1 further comprising the step of accumulating the phase difference metric for a predetermined period of time, and the step of calculating the frequency offset based on the phase difference metric comprises the step of calculating the frequency offset based on the accumulated phase difference metric.

4. An apparatus comprising:
   a radio-frequency (RF) front end (20) having a communication signal (15) as an input and outputting a plurality of orthogonal codes (25);
   a sub-element generator (30) having the plurality of orthogonal codes as an input and an output (35) consisting of sub-elements of the plurality of orthogonal codes that exist at a boundary between two code symbols; and
   a phase difference operator (40) having the sub-elements that exist at the boundary (35) as an input and outputting a phase difference metric between consecutive sub-elements (45).

5. The apparatus of claim 4 wherein the communication signal is a spread-spectrum communication signal.

6. The apparatus of claim 4 wherein the orthogonal codes comprise Walsh codes and the sub-elements comprise sub-Walsh elements.

* * * * *